US010823587B2

(12) United States Patent
McAdam

(10) Patent No.: US 10,823,587 B2
(45) Date of Patent: Nov. 3, 2020

(54) MEASUREMENT ENCODER

(71) Applicant: RENISHAW PLC, Gloucestershire (GB)

(72) Inventor: Simon Eliot McAdam, Nailsworth (GB)

(73) Assignee: RENISHAW PLC, Wotton-Under-Edge (GB)

( * ) Notice: Subject to any disclaimer, the term of this patent is extended or adjusted under 35 U.S.C. 154(b) by 76 days.

(21) Appl. No.: 15/024,519

(22) PCT Filed: Sep. 26, 2014

(86) PCT No.: PCT/EP2014/070617
§ 371 (c)(1),
(2) Date: Mar. 24, 2016

(87) PCT Pub. No.: WO2015/049174
PCT Pub. Date: Apr. 9, 2015

(65) Prior Publication Data
US 2016/0245673 A1 Aug. 25, 2016

(30) Foreign Application Priority Data

Oct. 1, 2013 (EP) .................................. 13275238

(51) Int. Cl.
*G01D 5/34* (2006.01)
*G01D 5/347* (2006.01)
(Continued)

(52) U.S. Cl.
CPC ....... *G01D 5/34715* (2013.01); *G01D 5/2457* (2013.01); *G01D 5/366* (2013.01); *G01D 5/38* (2013.01)

(58) Field of Classification Search
CPC ...... G01D 5/34715; G01D 5/366; G01D 5/38; G01D 5/2457
(Continued)

(56) References Cited

U.S. PATENT DOCUMENTS 3,586,665 A   6/1971   Weyrauch
4,792,679 A   12/1988  Bissegger
(Continued)

FOREIGN PATENT DOCUMENTS

CN   87106274 A   2/1988
CN   1061090 A    5/1992
(Continued)

OTHER PUBLICATIONS

"Annotated Photograph Believed to epict Canon SR Encoder Sold At Least Before 2012".
(Continued)

*Primary Examiner* — Georgia Y Epps
*Assistant Examiner* — Kevin Wyatt
(74) *Attorney, Agent, or Firm* — Oliff PLC

(57) ABSTRACT

An encoder apparatus including a scale including a series of features defining at least one scale track and a readhead for reading the scale's features. The readhead includes at least one light source for illuminating the scale and at least one detector. The configuration of the at least one light source is such that there is a structure in the light projected toward the scale. The readhead is configured such that the structure is angled so that it is substantially misaligned with respect to the scale's features so as to reduce measurement error in the signal output by the readhead.

15 Claims, 7 Drawing Sheets

(51) Int. Cl.
   *G01D 5/38* (2006.01)
   *G01D 5/36* (2006.01)
   *G01D 5/245* (2006.01)

(58) Field of Classification Search
   USPC ............ 250/231.13, 231.14, 231.15, 231.16,
   250/231.17, 231.18, 231.1
   See application file for complete search history.

(56) References Cited

U.S. PATENT DOCUMENTS

| | | | |
|---|---|---|---|
| 4,912,322 | A | 3/1990 | Ichikawa |
| 5,026,985 | A | 6/1991 | Ishizuka et al. |
| 5,569,913 | A | 10/1996 | Ishizuka et al. |
| 5,774,219 | A * | 6/1998 | Matsuura ................. G01D 5/38 250/237 G |
| 5,861,953 | A | 1/1999 | Henshaw |
| 6,605,828 | B1 | 8/2003 | Schwarzrock et al. |
| 7,227,124 | B2 | 6/2007 | Altendorf |
| 7,289,042 | B2 | 10/2007 | Gordon-Ingram |
| 7,624,513 | B2 | 12/2009 | Howley |
| 8,384,115 | B2 | 2/2013 | Li |
| 9,362,455 | B2 * | 6/2016 | Edmond ................. H01L 33/38 |
| 2005/0068539 | A1 * | 3/2005 | Tobiason ........... G01D 5/34723 356/499 |
| 2010/0025719 | A1 | 2/2010 | Li |
| 2010/0072456 | A1 * | 3/2010 | Weston .............. G01D 5/34715 257/13 |
| 2013/0292708 | A1 * | 11/2013 | Reiherzer ............. H01L 33/486 257/88 |
| 2017/0176220 | A1 * | 6/2017 | Kobayashi ......... G01D 5/34776 |

FOREIGN PATENT DOCUMENTS

| | | |
|---|---|---|
| CN | 1896695 A | 1/2007 |
| EP | 0350586 A2 | 1/1990 |
| EP | 1045227 B1 | 1/2007 |
| JP | S62-265525 A | 11/1987 |
| JP | H01-173829 U | 12/1989 |
| JP | H03-013901 A | 1/1991 |
| JP | H03-115920 A | 5/1991 |
| JP | H03-128418 A | 5/1991 |
| JP | H08-304118 A | 11/1996 |
| JP | H09-196706 A | 7/1997 |
| JP | 2002-005692 A | 1/2002 |
| JP | 2004-271453 A | 9/2004 |
| JP | 2006-349604 A | 12/2006 |
| WO | 02/084223 A1 | 10/2002 |
| WO | 2005/124282 A2 | 12/2005 |
| WO | 2010/049682 A1 | 5/2010 |

OTHER PUBLICATIONS

"Annotated Diagram of Renishaw's RG1 Head Sold At Least Before 2012".
"Annotated Photograph of Renishaw's TONiC Readhead Sold At Least Before 2012".
"Ultra Miniature Optical Encoder SR Series," Canon U.S.A., Inc. (Jan. 2011).
"Red Point Source LED Chip MED7P4," Daido Steel Co., Ltd. (Mar. 2009).
"Optoelektronische Sensoren für die Weg- und Winkelmessung," Reiner Burgschat, published before 2012.
Mar. 31, 2017 Office Action issued in Chinese Application No. 201480065266.2.
Jul. 31, 2018 Office Action issued in Japanese Application No. 2016-519754.
Jan. 16, 2015 International Search Report issued in International Patent Application No. PCT/EP2014/070617.
Jan. 16, 2015 Written Opinion issued in International Patent Application No. PCT/EP2014/070617.
Mar. 18, 2014 Search Report issued in European Patent Application No. 13275238.
"Chapter 9: High Extraction Efficiency Structures," https://www.ecse.rpi.edu/~schubert/Light-Emitting-Diodes-dot-org/chap09/chap09.htm, publised at least as early as Jul. 12, 2012.
C. Hammerschmidt, "Osram Claims Luminous Intensity Record with LED Spotlights," https://www.eenewsled.com/news/osram-claims-luminous-intensity-record-led-spotlights, Sep. 20, 2011.
S. Thaler"InteGreat Project Successfully Researches New Approaches to LED Production," https://www.osram.com/os/press/press-releases/integreat-project-successfully-researches-new-approaches-to-led-production.jsp, Dec. 7, 2018.
"StarLED Red Point Source LED Chip," https://www.daido.co.jp/en/products/led/pdf/med7p5_e.pdf, Oct. 2012.
Jun. 18, 2019 Office Action issued in Japanese Application No. 2016-519754.

* cited by examiner

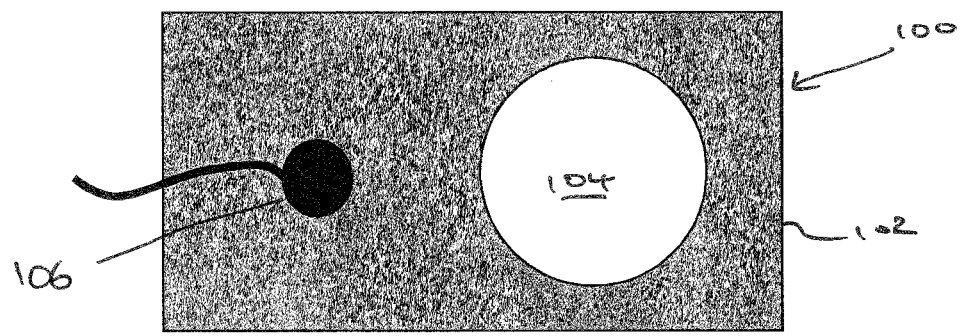
Fig. 5a
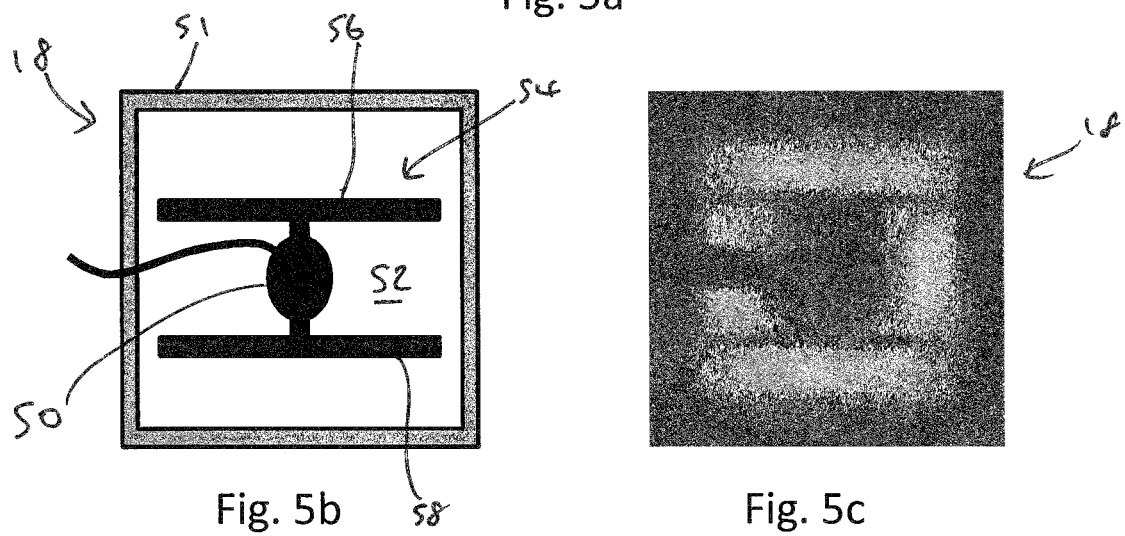
Fig. 5b
Fig. 5c
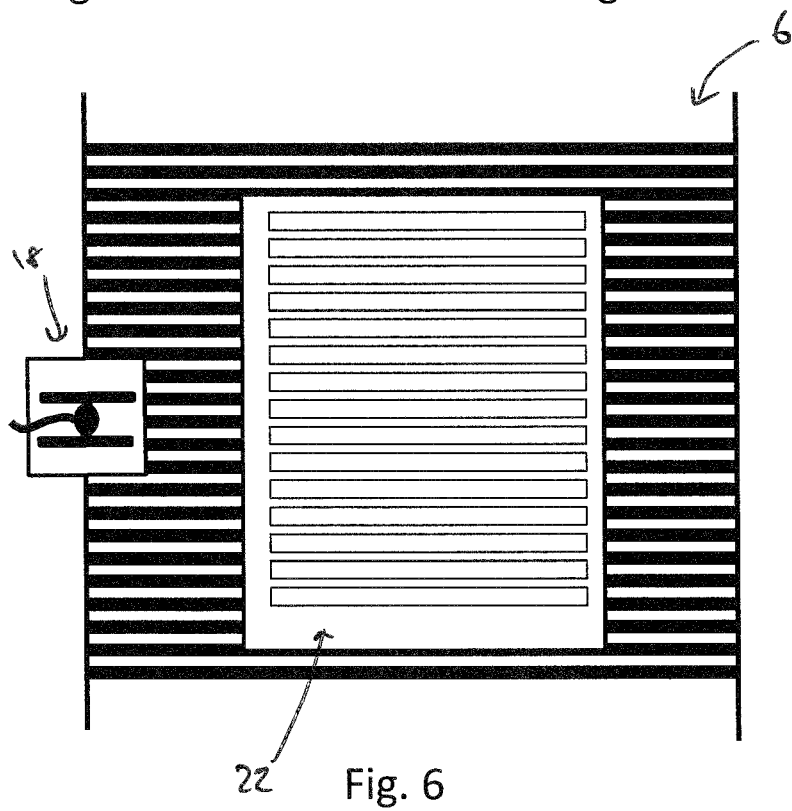
Fig. 6

MEASUREMENT ENCODER

The present invention relates to a measurement encoder. As will be understood, a measurement encoder typically comprises a scale comprising features and a readhead for reading the features so as to be able to determine relative position of the readhead and scale. The scale and readhead are moveable relative to each other.

Encoders are known wherein the scale comprises a series of generally periodic features which the readhead can read to determine and measure relative motion. Various types of encoder exist, including incremental encoders and absolute encoders. Typically, incremental encoders comprise a scale comprising series of periodic markings which are "read" by a readhead. For example, they can operate by the scale (and often one or more diffraction gratings within the readhead) interacting with light from a source within the readhead to generate at a detector a resultant field (e.g. modulated spot(s) or interference fringes) which changes with relative movement of the scale and readhead. Often, one or more reference marks are provided (e.g. embedded within or next to the series of features) such that relative position can be determined with respect to known reference positions defined by the reference marks. An example of an incremental encoder is described in WO2005/124282.

Typically, absolute encoders operate by the scale defining unique patterns (e.g. codes) which can be read by a readhead. Examples of absolute encoders are described in WO2002/084223 and WO2010/049682. As with incremental encoders, absolute encoders can comprise a light source for illuminating the scale during reading of the scale.

Our inventors wanted to provide an improved encoder, and in particular an encoder with improved accuracy.

According to a first aspect of the invention there is provided an encoder apparatus comprising a scale comprising a series of features defining a scale track and a readhead for reading the scale's features, the readhead comprising at least one light source for illuminating the scale and at least one photodetector, characterised in that the configuration of at least one light source imparts a structure (e.g. a pattern) into the light it projects, and in which the readhead is configured such that the structure as projected toward the scale is angled so that it is substantially misaligned with respect to the scale's features so as to reduce measurement error in the signal output by the readhead.

Accordingly, the invention has identified that the negative effect of adverse structures in the light from the source can be reduced or even eliminated by configuring the readhead such that the structure as projected toward the scale is angled so that it is substantially misaligned with respect to the scale's features (or as explained in more detail below with respect to the readhead's array of sensing channels) so as to reduce measurement error in the signal output by the readhead As will be understood, the structure can be within the field of light projected from the at least one light source. For example, it could comprise a variation in the intensity of light within the field of light projected from the at least one light source.

Our inventors have found that when using a light source which imparts a structure into the light it projects, significant errors can be present in the signal output by the readhead. However, our inventors have found that these errors can be reduced by angling the structure as it is projected toward the scale, with respect to the scale's features so that so that it is misaligned (i.e. angularly misaligned) with respect to the scale's features. In particular, our inventors have determined that such structure can effectively split a light source into a plurality of separate point sources, which results in the signal at the readhead's detector being distorted. By turning the structure such that it is misaligned with respect to the scale's features, such distortions can be reduced. In the case of incremental encoders this can thereby lead to a reduction in cyclical errors present in the signal output by the encoder apparatus. In the case of incremental encoders this can thereby lead to a reduction in the mis-reading of features on the scale. In both cases our invention reduces the chance of and/or extent of incorrect position determination.

The structure could be configured to be misaligned by positioning/orienting the at least light source such that the structure from the emission point is misaligned (e.g. such that the light source is angled). Optionally, one or more optical components could be used to cause the structure to be misaligned. Accordingly, in this case, at point of emission, the structure could be aligned.

The structure can comprise predominant elongate components. In this case, preferably any such predominant elongate components of the structure in the light are angled/misaligned with respect to the scale's features, in particular with respect to the longitudinal extent of the scale's features (for example, by at least 5 degrees, for instance at least 10 degrees, optionally by at least 15 degrees).

The at least one light source can impart periodicity in the structure of the light projected, in at least one direction. Preferably, the readhead is configured such that the direction of periodicity is angled so that it is substantially misaligned with respect to the scale's features, in particular, angled with respect to the direction of periodicity of the scale's features, and optionally with respect to the measurement direction of the scale. The structure can be such that there is more than one direction of periodicity. In which case, it can be preferred that all directions of periodicity are angled so as to be misaligned with respect to the scale's features.

The at least one light source can be configured such that the intensity distribution of light projected toward the scale, as measured in the measuring dimension, has a modulation depth of no more than 0.5, for example no more than 0.4, for instance, no more than 0.35

The structure in the light can comprise an array of features. The readhead can be configured such that the array of features is angled with respect to the scale's features. As will be understood, an array can comprise two or more features. Optionally, the features are substantially elongate. Optionally, the features are substantially parallel. As will be understood, such features need not necessarily be straight, for example they can comprise curved and/or wavy elongate, parallel features.

The at least one light source can comprise at least one feature at or near its emission surface which impart the structure into the projected light. For instance, the at least one feature could comprise a part integral to the at least one light source. For example, the at least one feature could comprise at least one current spreader. Optionally, such feature(s) can comprise a bond pad. The at least one light source can comprises a light emitting diode (LED). The LED can comprise feature(s) (for example at or near the emission surface of the LED) which impart the structure into the projected light.

The detector can comprise a photodetector array. Such a photodetector array can define a plurality of sensing channels extending in an array. The direction of such an array can extend substantially parallel to the reading direction of the readhead. The readhead can be configured such that the structure in the light as it is projected from the light source toward the scale is angled with respect to the plurality of sensing channels.

The readhead can comprise at least one diffraction grating. Optionally, the readhead can comprise at least one lens. The at least one lens can be used to interact with light travelling from the scale toward the detector. Optionally, the at least one lens can be used to form an image of the scale on the detector.

The encoder apparatus can comprise an incremental encoder apparatus. In this case the scale can comprise a series of incremental scale marks, for example a series of generally periodic features. The encoder apparatus, for example the readhead, can be configured such that the structure (in the light) is angled so that it is substantially misaligned with respect to the scale's series of incremental marks.

The scale can be a phase scale or an amplitude scale. That is the scale's features can comprise features configured to manipulate the phase or amplitude of the light leaving the scale toward the readhead. As will be understood, typically the period of the scale's features is less than 500 μm (microns), optionally less than 200 μm (microns), for example less than 100 μm (microns), for instance less than 50 μm (microns). At least one reference mark can be provided on or next to the scale. The reference mark can be embedded within the scale's incremental scale features. The readhead can comprise at least one reference mark photodetector for detecting the at least one reference mark. The encoder apparatus, for example the readhead, can be configured such that the structure (in the light) is angled so that it is substantially misaligned with respect to the reference mark.

Optionally, the encoder apparatus can comprise an absolute encoder apparatus. Accordingly, the scale can comprise features defining a series of uniquely identifiable positions, preferably a continuous series of uniquely identifiable positions.

The encoder apparatus can be configured to obtain snapshot representations (e.g. images) of the scale's features.

As will be understood, a light source could comprise one or more light emission components. The optical power (in dioptres, $m^{-1}$) of any optical component in the optical path between the light emission component and the at least one detector (for example in the part of the optical path within readhead) can be between −100 and 100, for example between −50 and 50, for instance between −10 and 10, in particular between −5 and 5. Optionally, the optical power (in dioptres, $m^{-1}$) of any optical component in the optical path between the light emission component and the at least one detector (for example in the part of the optical path within readhead) is substantially 0. Accordingly, optionally, no lens is provided in the optical path between the light emission component(s) of the light source and the at least one detector (for example in the part of the optical path within readhead).

Optionally, the optical power (in dioptres, $m^{-1}$) of any optical components in the readhead is between −100 and 100, for example between −50 and 50, for instance between −10 and 10, in particular between −5 and 5, for example substantially 0.

The light source can comprise a divergent light source (e.g. can produce a divergent light beam). Optionally, the light beam's divergence can remain substantially unaltered throughout the above mentioned optical path.

Light from the at least one light source can interacts with the scale and at least one diffraction grating within the readhead to produce an resultant field at the detector which changes with relative movement of the scale and readhead. Such changes in the resultant field can be used to determine the relative position of the readhead and scale. The resultant field can comprise at least one region of light which modulates with relative movement of the readhead and scale (e.g. the resultant field can comprise a modulated spot). Optionally, the resultant field comprises an interference fringe.

Accordingly, the readhead can comprise a diffraction grating. The encoder apparatus can be configured such that the light from the at least one light source interacts first with the scale to produce a first set of diffraction orders which then in turn interact with the diffraction grating in the readhead to produce further diffraction orders which then combine to produce an interference fringe at the detector which changes with relative movement of the scale and readhead.

As will be understood, the structure (in the light projected) can comprise a pattern, e.g. can comprise an identifiable regular pattern.

The at least one light source could emit light in the visible range. As will be understood, suitable light sources include those that emit light anywhere in the infra-red to the ultraviolet range of the electromagnetic spectrum. Optionally, the light source emits light in the infra-red range.

According to a second aspect of the invention there is provided an encoder readhead for reading a scale to determine the relative position between them, the readhead comprising: at least one light source for illuminating a scale, in which the configuration of the light source imparts a structure (e.g. a pattern) into the light it projects; and an array of photodetectors defining a plurality of sensing channels extending in an array that is substantially parallel to the reading direction of the readhead; in which the readhead is configured such that the structure in the light as it is projected from the light source toward the scale is angled with respect to the plurality of sensing channels.

Embodiments of the invention will now be described, by way of example only, with reference to the following drawings in which.

Figure 1:
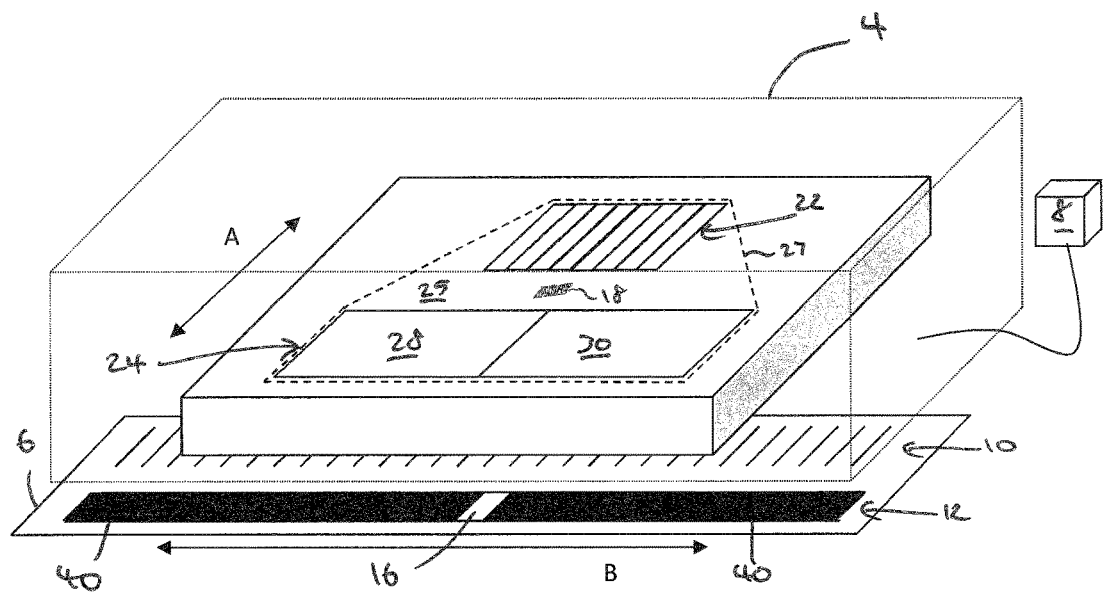
FIG. 1 is a schematic isometric diagram of a reflective encoder according to the present invention.
Figure 10:
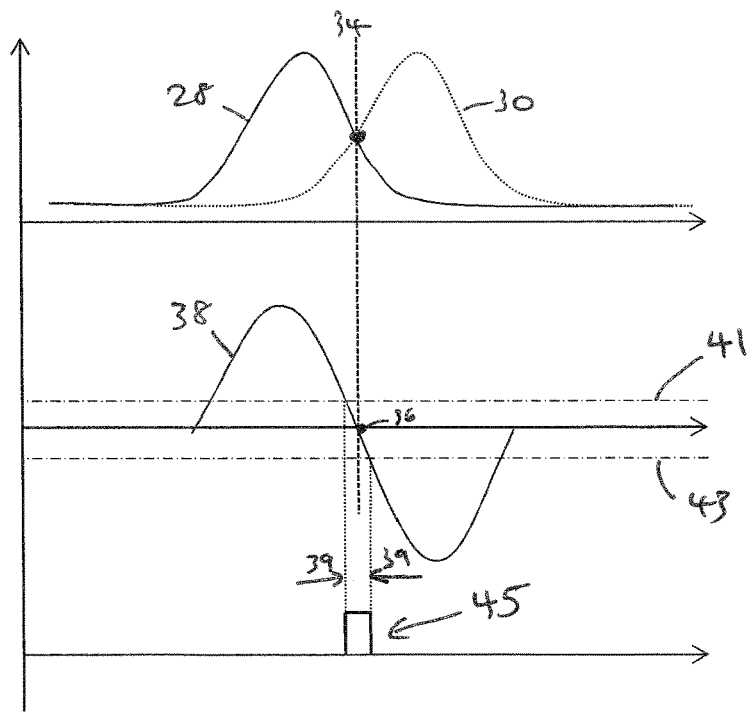
Figure 7:
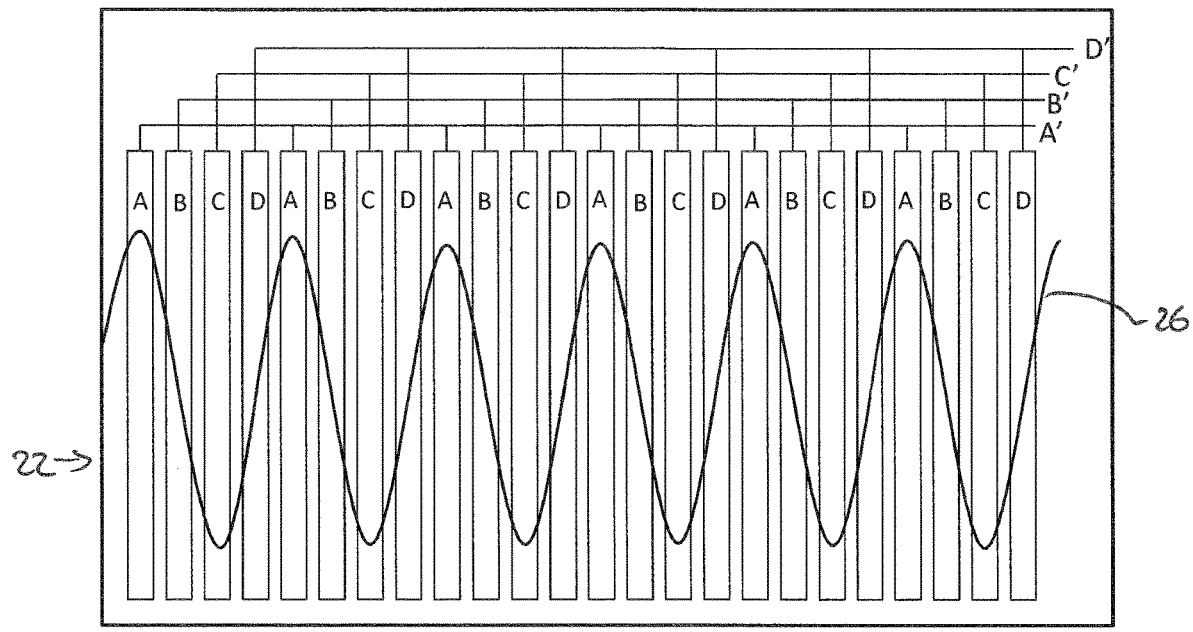
Figure 8:
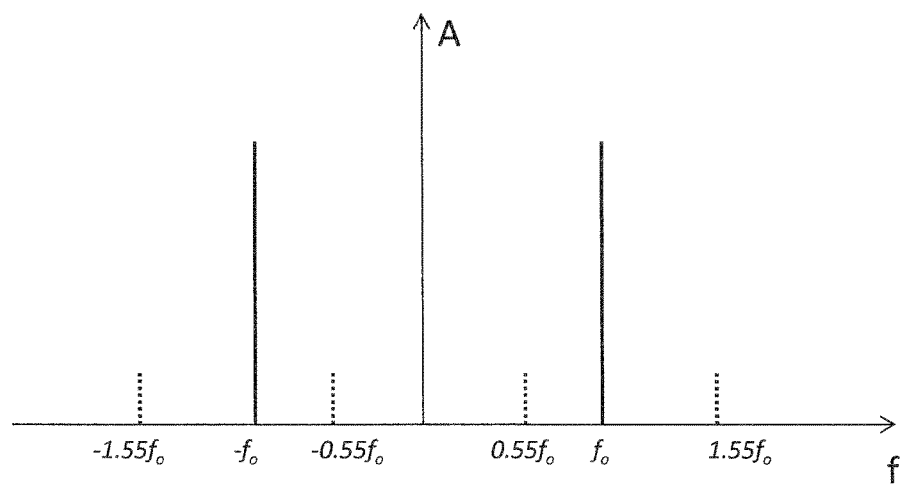
Figure 9:
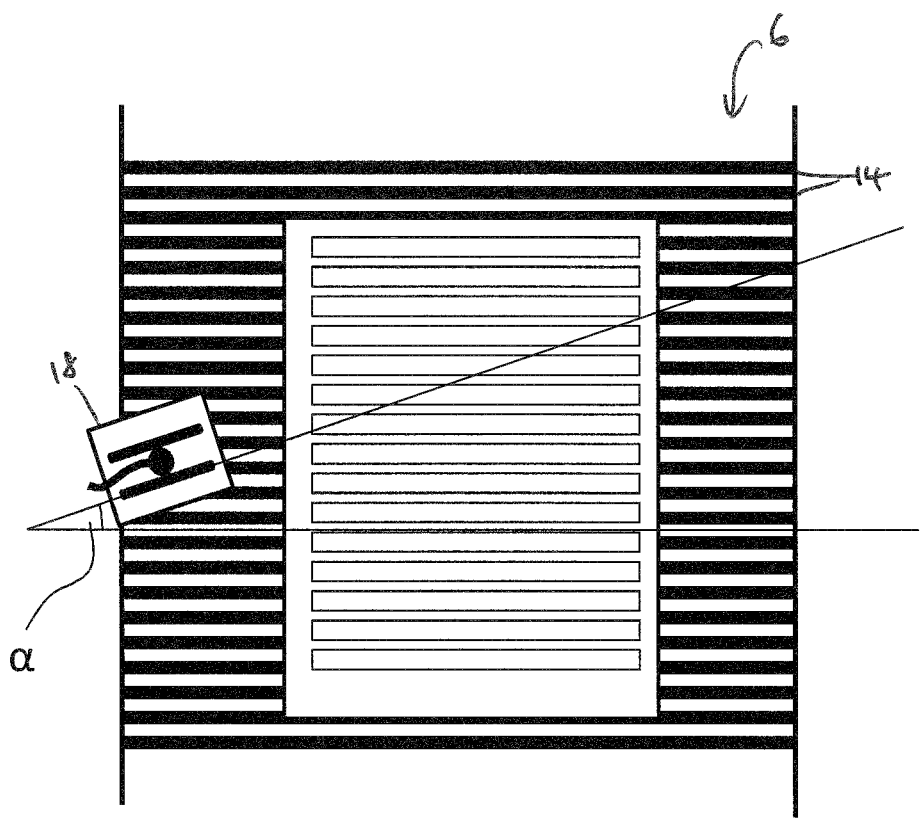
Figure 11:
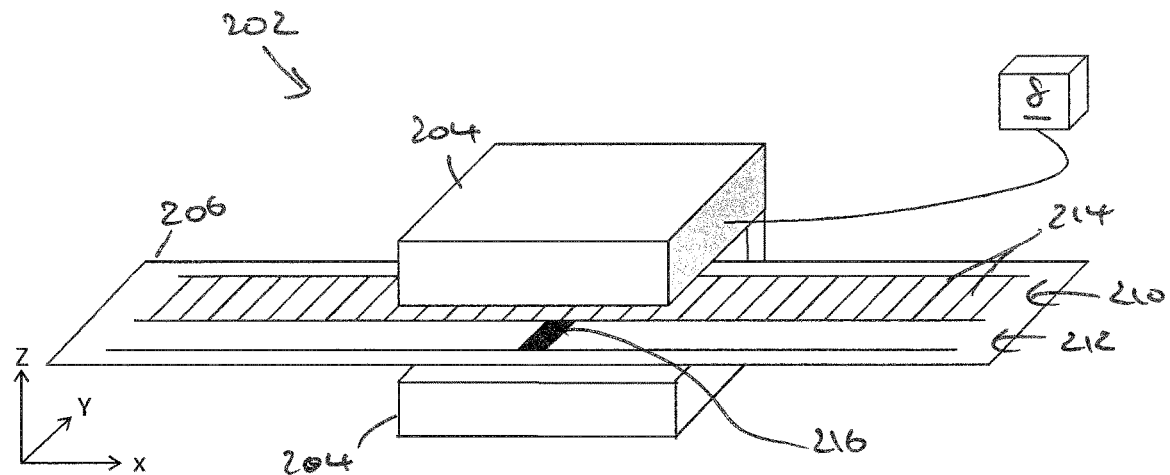
Figure 12:
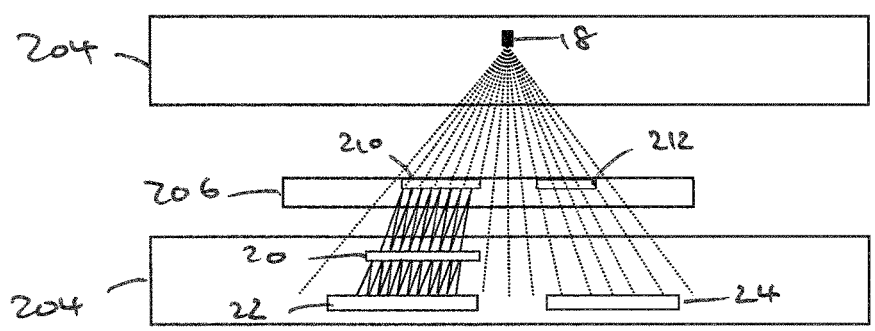
Figure 13:
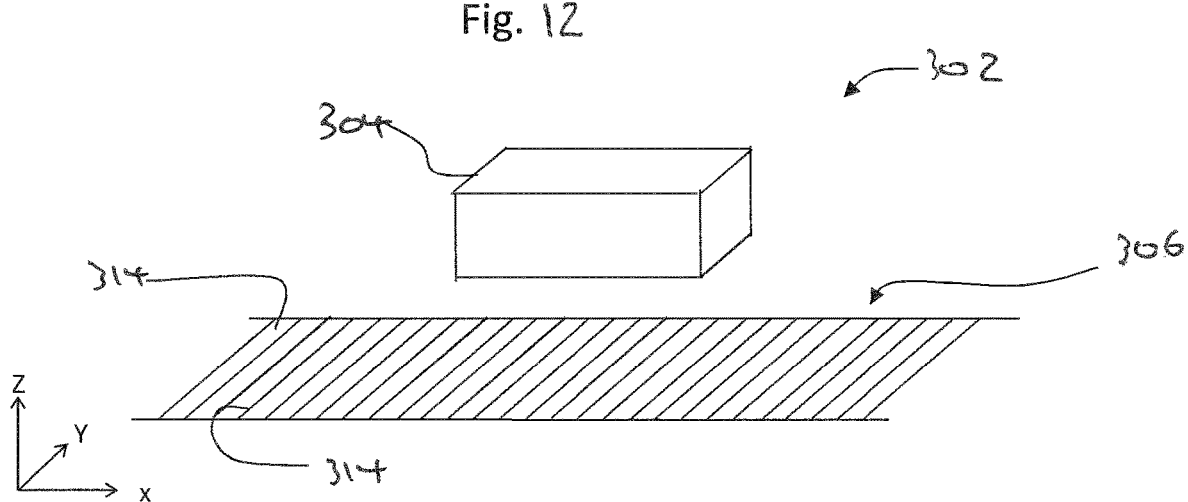
Figures 14A, 14B:
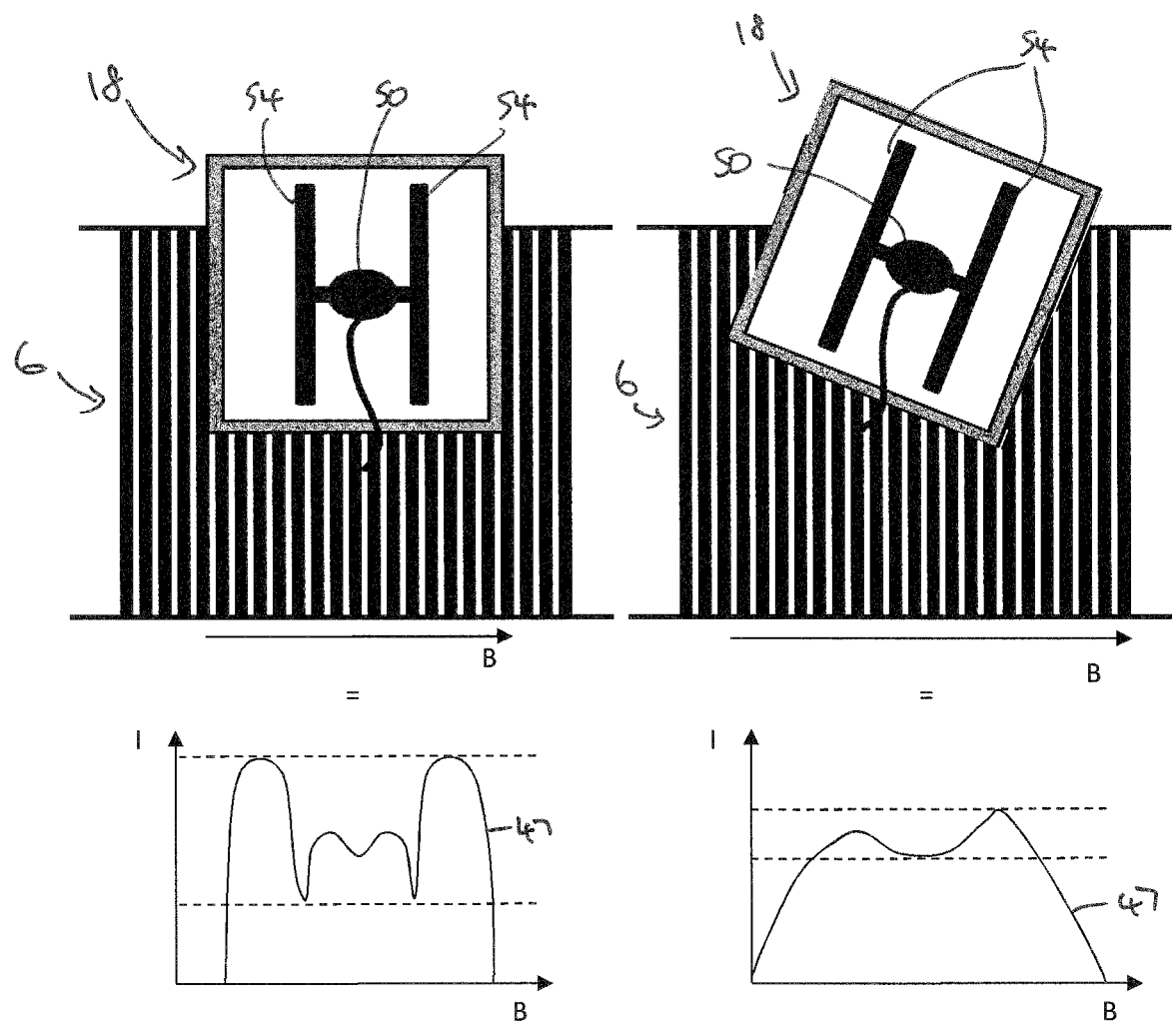

FIG. 5a schematically illustrates a light source which does not impart a structure into the light it projects toward the scale;

FIGS. 5b and 5c respectively shown graphical representation and images of the light source of the encoder of FIG. 1 according to the invention;

FIG. 6 schematically illustrates a light source set up which gives a poor quality interference fringe;

FIG. 7 schematically illustrates the ideal fringe intensity across an incremental photodetector;

FIG. 8 schematically is a graph illustrating the Fourier Transform of an interference fringe having poor harmonic quality obtained for example by a set up such as that shown in FIG. 6;

FIG. 9 schematically illustrates a light source set up which gives a good quality interference fringe according to one embodiment of the invention;

FIG. 10 is a graph illustrating the detecting of a reference position for the encoder of FIG. 1;

FIG. 11 schematically illustrates a transmissive encoder according to the present invention;

FIG. 12 is a schematic cross-sectional view of the encoder of FIG. 11, looking along the length of the scale;

FIG. 13 schematically illustrates a single-track incremental encoder according to the present invention; and FIGS. 14a and 14b illustrate the effect angling a light source has on the modulation depth of the light source's intensity distribution as measured in the encoder apparatus' measuring dimension.

Figure 2:
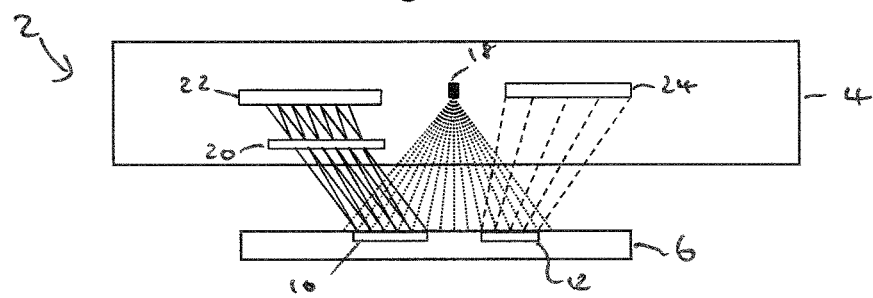
FIG. 2 is a schematic cross-sectional view of the encoder of FIG. 1, looking along the length of the scale.

With reference to FIGS. 1 and 2 there is shown an encoder apparatus 2 according to the present invention. The encoder apparatus comprises a readhead 4 and a scale 6. Although not shown, typically in practice the readhead 4 will fastened to one part of a machine and the scale 6 to another part of the machine which are movable relative to each other. The readhead 4 is used to measure the relative position of itself and the scale 6 and hence can be used to provide a measure of the relative position of the two movable parts of the machine. Typically, the readhead 4 communicates with a processor such as a controller 8 via a wired (as shown) and/or wireless communication channel. The readhead 4 can report the signals from its detectors (described in more detail below) to the controller 8 which then processes them to determine position information and/or the readhead 4 can itself process the signals from its detectors and send position information to the controller 8.

The scale 6 comprises a plurality of scale markings defining an incremental track 10, and a reference track 12.

The incremental track 10 comprises a series of periodic scale marks 14 which control the light transmitted toward the readhead to effectively form a diffraction grating. The incremental track 10 could be what is commonly referred to as an amplitude scale or a phase scale. As will be understood, if it is an amplitude scale then the features are configured to control the amplitude of light transmitted toward the readhead's incremental detector (e.g. by selectively absorbing, scattering and/or reflecting the light). As will be understood, if it is a phase scale then the features are configured to control the phase of light transmitted toward the readhead's incremental detector (e.g. by retarding the phase of the light). In the present embodiment, the incremental track 10 is an amplitude scale, but in either case, as explained in more detail below, the light interacts with the periodic scale marks 14 to generate diffracted orders.

Reference positions can be useful to enable the readhead 4 to be able to determine exactly where it is relative to the scale 6. Accordingly, the incremental position can be counted from the reference position. Furthermore, such reference positions can be what are also referred to as "limit positions" in that they can be used to define the limits or ends of the scale 6 between which the readhead 4 is permitted to travel.

In this embodiment, the reference track 12 defines a reference position by having at least one feature 16 which permits a relatively greater amount of light from the source 18 to reach the reference detector 24 compared to the rest of the reference track. Accordingly, the scale 6 (and in particular the reference track 12) comprises markings in the form of light restrictor markings 40 which extend along the length of the reference track 12. These light restrictor markings 40 need not necessarily completely stop the light from reaching the reference detector 24. Rather they could, for example, merely reduce the amount of light reaching the reference detector 24 compared to the reference mark feature 16.

In this embodiment, the encoder apparatus is a reflective encoder in that it comprises an electromagnetic radiation (EMR) source 18, e.g. an infra-red light source 18, and at least one detector (described in more detail below) on the same side of the scale 6. In general, infra-red from the light source 18 is configured to be reflected by the scale 6 back toward the readhead. As illustrated, the light source 18 is divergent and the light source's illumination footprint falls on both the incremental track 10 and the reference track 12. In the embodiment described, the light source 18 emits EMR in the infra-red range, however as will be understood, this need not necessarily be the case and could emit EMR in other ranges, for example anywhere in the infra-red to the ultra-violet. As will be understood, the choice of a suitable wavelength for the light source 18 can depend on many factors, including the availability of suitable gratings and detectors that work at the EMR wavelength. As also illustrated, the readhead 4 also comprises a diffraction grating 20 (also commonly referred to as an index grating), an incremental photodetector 22 and a reference photodetector 24.

In the embodiment described, the infra-red light source 18 is a Light Emitting Diode ("LED").

As shown, the infra-red light source 18 is positioned between the incremental photodetector 22 and the reference photodetector 24, in a direction (illustrated by arrow A) transverse to the reading direction (illustrated by arrow B) of the readhead. This facilitates good even illumination of both the incremental track 10 and reference track 12. In particular, in this embodiment, the light source 18 is positioned substantially equidistantly between the incremental photodetector 22 and the reference photodetector 24, and is contained within an area 25 defined by the outer extents of the readhead's 4 incremental 22 and reference 24 photodetectors (schematically illustrated by the dashed line 27). Furthermore, in accordance with the invention, as illustrated, the light source 18 is angled, the reasons for which are explained in more detail below.

These optical components will be explained in more detail below, but in summary, the infra-red light from the from the light source 18 is emitted from the readhead 4 toward the scale 6, where part of the light source's 18 footprint interacts with the reference track 12 and part of the light source's footprint interacts with the incremental track 10. In the currently described embodiment, the reference position is defined by a feature 16 in the reference track 12 which reflects more of the light from the light source 18 back toward the reference photodetector 24 compared to the rest of the track. This could be achieved, for example, by the light restrictive features 40 absorbing, transmitting and/or scattering more infra-red light than the feature 16 itself. In any case, a shadow/non-imaged representation of the scale's mark(s) defining the reference position (in this case a shadow of the light restrictive features 40) is therefore cast on the reference detector 24 as the readhead 4 passes along the scale 6. As the readhead 4 passes over the reference position, feature 16 increases the amount of light from the source 18 reaching the reference photodetector 24. In the position illustrated in FIG. 2, the readhead 4 is aligned with the reference position and so the light is shown as being reflected back toward the reference photodetector 24.

With reference to the detection of a reference position, in accordance with the above, when the readhead 4 passes over the reference position, the feature 16 causes more light to be reflected back toward the reference photodetector 24. Accordingly, the readhead 4, and/or controller 8 can be configured to look for a change (in this case an increase) in the intensity of light received at the reference photodetector 24. As illustrated, in the embodiment described the reference photodetector 24 is actually a "split detector" which comprises first 28 and second 30 separate detector channels offset relative to each other in the measuring direction. Each of these two separate detecting channels measure the intensity of light falling on it, and provides an output proportional to the intensity measured.

In this embodiment the scale marking's (i.e. the light restrictor markings 40) that define the reference mark feature 16 cast a shadow onto the reference detector 24 for most of the length of the scale 6. (In other words, the reference detector 24 is in the light restrictor marking's 40 shadow for most of the length of the scale). However, as the readhead 4 passes the reference position, the reference mark feature 16 reflects light from the source 18 back toward the first 28 and second 30 detector channels of the reference detector 24. The outputs of the first 28 and second 30 detecting channels therefore peak as the readhead 4 passes the reference position, which is illustrated by the top portion of the graph in FIG. 10.

As the first 28 and second 30 detecting channels are offset in the measuring direction, the peak in intensity reported by one of the detecting channels lags behind the other. In this embodiment, the feature 16 and the first 28 and second 30 detector channels are configured such that the reference position can be determined by determining when a difference signal 38 of the outputs of the first 28 and second 30 detector channels (e.g. obtained via a differential amplifier) crosses between upper 41 and lower 43 threshold levels. As illustrated, this "zone" defined by the two threshold levels 43 contains the point at which the two signals 28, 30 cross (at the point illustrated by line 34) and hence also contains the point at which the difference signal 38 crosses a zero value (e.g. at point 36). Accordingly, the reference position is actually determined as a reference "zone" 39 between two threshold levels 41, 43. When the difference signal is within this zone 39, a reference pulse, schematically illustrated by pulse 45 is output by the readhead 4 to the controller/processor device 8. The width of the reference pulse is not greater than one lissajous cycle of a lissajous which can be determined from the incremental quadrature signals. More details on detecting a reference position by obtaining the difference between outputs of two detecting channels is described in U.S. Pat. Nos. 7,624,513 and 7,289,042.

With respect to the incremental track 10, light from the source 18 falls on the periodic scale marks 14 which define a diffraction pattern. The light therefore diffracts into multiple orders, which then fall onto the diffraction grating 20 in the readhead 4. In the present embodiment, the diffraction grating 20 is a phase grating. The light is then further diffracted by the diffraction grating 20 into orders which then interfere at the incremental photodetector 22 to form a resultant field, in this case an interference fringe.

Figure 3:
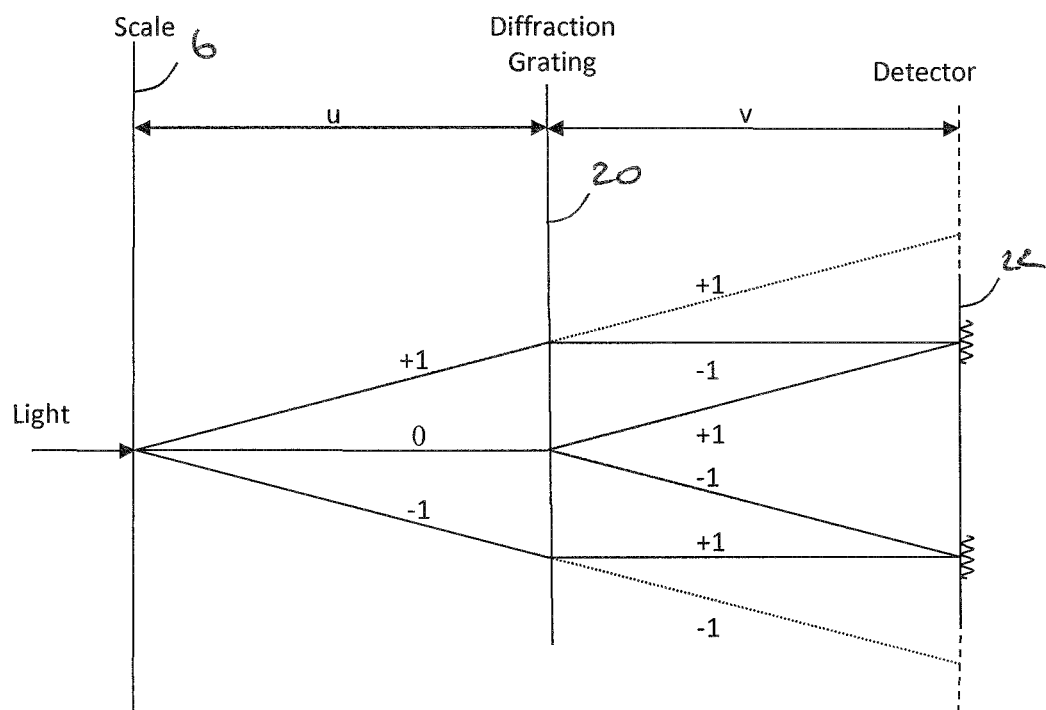
FIGS. 3 and 4 are schematic ray diagrams schematically illustrating the generation of a resultant field at the incremental photodetector via the use of diffracted light so as to facilitate incremental reading of the readhead position.
Figure 4:
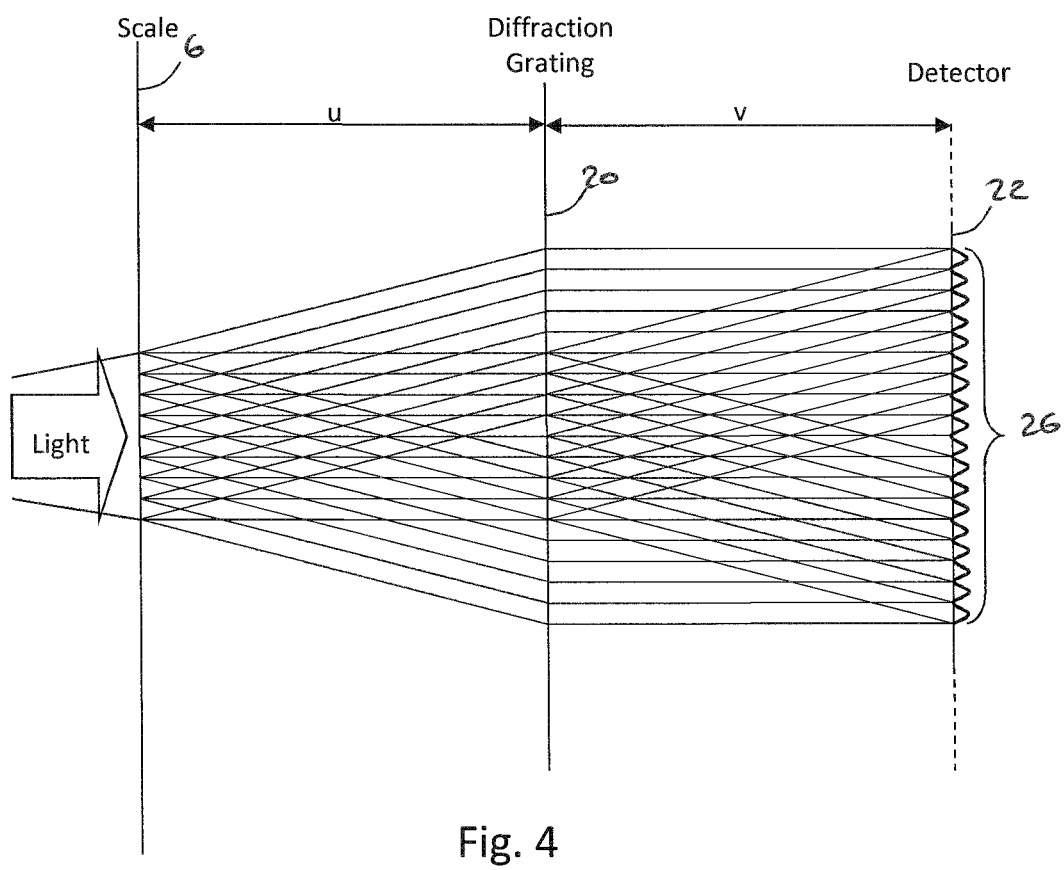

The generation of the interference fringe is explained in more detail with reference to FIGS. 3 and 4. As will be understood, FIG. 3 is a very simplified illustration of the real optical situation encountered in an encoder apparatus. In particular, the situation is shown for only one light ray from the source whereas in fact an area of the incremental track 10 is illuminated by the source. Accordingly, in reality the optical situation shown in FIG. 3 is repeated many times over along the length of the scale (i.e. over the area that is illuminated by the source), hence producing a long interference pattern at the detector, which is schematically illustrated in FIG. 4. Also, for illustrative purposes only the $+/-1^{st}$ orders are shown (e.g. as will be understood the light will be diffracted into multiple orders, e.g. $+/-3^{rd}$, $+/-5^{th}$, etc diffraction orders). The light is diffracted by the series of periodic features 14 in the incremental track 10 of the scale 6, and the diffraction orders propagate toward the diffraction grating 20 where the light is diffracted again before forming a resultant field 26 (in this case an interference fringe, but could for example be modulated spot(s)) at the incremental detector 22. As shown in FIG. 4, the resultant field 26 is produced by the recombination of diffracted orders of light from the diffraction grating 20 and scale 6.

For the sake of simplicity of illustration the ray diagrams in FIGS. 3 and 4 are shown as transmissive ray diagrams (that is the light is shown as being transmitted through each of the scale and diffraction grating), whereas in reality at least one of these could be reflective. For example, with the embodiment of FIGS. 1 and 2, the rays would be reflected from the scale 6.

The incremental detector 22 detects the resultant field 26 (e.g. the interference fringes) to produce a signal which is output by the readhead 4 to an external device such as controller 8. In particular, relative movement of the readhead 4 and scale 6 causes a change in the resultant field 26 (e.g. movement of the interference fringes relative to the detector 22 or a change in intensity of the modulated spot(s)) at the incremental detector 22), the output of which can be processed to provide an incremental up/down count which enables an incremental measurement of displacement.

The incremental detector 22 can comprise a plurality of photodiodes, for example. In particular, as will be understood, in embodiments in which an interference fringe 26 is produced at the incremental detector 22, the incremental detector 22 can be in the form of an electro-grating, which in other words is a photo-sensor array which can for example comprise two or more sets of interdigitated/interlaced photo-sensitive sensors, each set detecting a different phase of the interference fringe 26 at the detector 22. An example is illustrated in FIG. 7, in which a part of an incremental detector 22 is shown, and in which the photodiodes of four sets of photodiodes A, B, C and D are interdigitated, and the outputs from each photodiode in a set are combined to provide a single output, A', B', C' and D'. These outputs are then used to provide quadrature signals. For example, A'-C' could be used to provide a first signal and B'-D' could be used to provide a second signal which is 90 degrees out of phase from the first signal (e.g. Cos and Sin signals). As illustrated, at any one instant in time, all the photodiodes in any one set detect the intensity of same phase of the interference fringe (if the fringe period and sensor period are the same). This arrangement has the advantage that due to a filtering effect of the optics, the readhead 4 is largely immune to a disruption to the periodicity of the periodic scale marks 14. Thus, the presence of contamination and/or an embedded reference mark does not significantly affect the interference fringe detected by the incremental detector 22.

More details of a scale and readhead of this type are described in U.S. Pat. No. 5,861,953, the entire contents of which are incorporated into this specification by this reference. As will be understood, the electrograting/photo-sensor array can take other forms, such as comprising only three sets of photodiodes that are interdigitated, and different layouts can be used.

FIG. 7 shows the ideal case in which a clean interference fringe having an intensity which varies sinusoidally in-phase with the periodicity of the interlaced photo-sensitive sensors A, B, C, D as illustrated by line 26. However, as will be understood, in practice there will often be noise present in the interference fringe caused by various factors.

Furthermore, up until recently our inventors sought to use a "clean" or "unstructured" light source such as that illustrated in FIG. 5*a*. FIG. 5*a* illustrates an LED 100, comprising a circular emission area 104 and a wire bond 106. However, for many reasons including a desire to reduce the size of the readhead 4, our inventors have looked for alternative light sources. One particular type of light source the inventors have chosen to use is illustrated in FIGS. 5b and 5c. This light source 18 has a wire bond 50 is provided on the surface of the emission area 52. Furthermore, current spreaders 54 are provided on the emission area 52 surface. As shown, the wire bond 50 is centrally mounted within the square-shaped emission area 52 and the current spreaders predominantly comprises first 56 and second 58 elongate arms, extending parallel to each other, together defining a substantially H-shaped pattern/formation (which is imparted into the light projected from the light source). As illustrated in the image of an actual source in FIG. 5c, these wire bond 50 and current spreader 54 features impart an adverse (e.g. unwanted/harmful) structure into the light projected from the light source 18, in this case in the form of a substantially H-shaped pattern/formation.

It has been found that the use of such a light source 18 can have a significant adverse effect on the interference fringe generated at the incremental detector 22. For example, FIG. 8 shows a graph of a Fourier Transform of an interference fringe generated using a set up such as that shown in FIG. 6. With an ideal interference fringe (i.e. as illustrated by FIG. 7), the Fourier Transform only comprises components at the fundamental frequency $f_o$. However, as shown in FIG. 8 the interference fringe will become distorted because it contains significant unwanted/adverse non-integer harmonic (e.g. sub-harmonic) components (in this case, as shown 0.55 $f_o$ and 1.55 $f_o$), and hence significantly reduces the accuracy of the readhead 4.

However, our inventors have found that by configuring the readhead such that any predominant elongate structures of the light source 18 are angled relative to the plurality of sensing channels A, B, C, D of the incremental photodetector 22, the amplitude of such non-integer harmonic components (e.g. in the embodiment described above, the amplitude of the components 0.55 $f_o$ and 1.55 $f_o$) is reduced, thereby improving the quality of the interference fringe. For instance, if the light source 18 of FIGS. 5b and 5c is mounted at an angle as illustrated in FIG. 9, such that the first 56 and second 58 current spreader arms are angled relative to the periodic features 14 of the incremental track 10, (and in this embodiment also angled relative to the array of photodetector elements A, B, C, D of the incremental detector 22) it has been found that the amplitude of the non-integer harmonic components is significantly reduced.

Our inventors have determined that the first 56 and second 58 elongate arms of the light source's 18 current spreader 54 effectively splits the light source into separate, periodically arranged sources, which act to generate separate sets of diffraction orders and secondary interference fringes which adversely interfere with the predominant interference fringe 26 so as to distort it. This is illustrated in FIG. 14a in which the graph illustrates the intensity distribution profile 47 of light from the source as measured in the encoder's measuring dimension B. As can be seen, the presence of the current spreaders 54 and wire bond 50 cause a significant dip in the intensity distribution profile, causing substantial peaks and troughs in the intensity distribution profile leading to the above mentioned apparent separate light sources. As shown, the intensity distribution profile as measured in the encoder's measuring dimension B has a modulation depth (highlighted by the dashed lines) of over 0.5, for example about 0.6. (As will be understood, the modulation depth is the difference between the maximum peak and minimum trough values of the modulated intensity distribution profile (in this case as measured in the measurement dimension), divided by the sum of the peak and trough values).

By configuring the light source 18 such that the first 56 and second 58 elongate arms are angled, the periodicity of the effective point sources is no longer aligned with the periodic scale features 14, nor the periodically arranged photodetector elements A, B, C, D of the incremental photodetector 22. FIG. 14b illustrates an example in which the LED of the embodiment of FIG. 14a has been rotated by approximately 16 degrees, the graph illustrating the intensity distribution of light from the angled source as measured in the encoder's measuring dimension B. As can be seen the depth of any troughs in the intensity distribution taken the measuring direction has been reduced and hence the modulation depth is significantly reduced. In this embodiment, the modulation depth has been approximately halved to about 0.3. Such a configuration reduces the amplitude of the above described secondary interference fringes, thereby reducing the amplitude of non-integer harmonic components in the interference fringe (i.e. at least halved), and hence lessening their distorting impact on the interference fringe 26.

As will be understood, the optimum angle at which the light source 18 should be placed will vary from encoder to encoder, depending on factors such as the shape of the structure imparted in the light projected from the light source 18, and/or the period of the incremental scale marks 14 and/or the period of the diffraction grating 20. Also, practical limitations, such as space, might restrict the angle at which the light source can be oriented. Nevertheless, our inventors have found that with the configuration described above, a significant reduction in the distortion can be achieved by angling the light source 18 by a value of somewhere between 10 and 20 degrees, for example approximately 16 degrees (e.g. such that the angle α between the first elongate arm 56 (and/or second elongate arm 58) of the current spreader 54 and the periodic scale features (and also the periodically arranged photodetector elements A, B, C, D of the incremental photodetector 22 as illustrated in FIG. 9) is at a value of somewhere between 10 and 20 degrees, for example approximately 16 degrees). Nevertheless, as will be understood, in the present embodiment, a reduction in the distortion can be achieved with the light source at any angle other than 0 and 180 degrees, although significant distortion can be achieved by angling it by between 5 and 175 degrees, in particular between 10 and 170 degrees.

Furthermore, it has been found that by angling the light source 18 such that the first elongate arm 56 (and/or second elongate arm 58) of the current spreader 54 is perpendicular to the periodic scale features (and also the periodically arranged photodetector elements A, B, C, D of the incremental photodetector 22 as illustrated in FIG. 9) can effectively eliminate any of the above described distortion in the interference fringe 26, returning the interference fringe 26 as close to that as illustrated in FIG. 7 (which of course will still be susceptible to random noise).

As will be understood, the invention is applicable to other types of light sources having features (such as wire bonds, current spreaders) which impart a structure into the light projected.

In the above described embodiments, the encoder apparatus 2 is a reflective encoder apparatus. However, as will be understood, this need not necessarily be the case and the invention is equally applicable to transmissive encoder apparatus 202, as illustrated in FIGS. 11 and 12. In this case, the scale 206 is primarily configured to allow light from the readhead's 204 light source 18 through it toward the incremental 22 and reference 24 photodetectors in the readhead 204 which are located on the opposite side of the scale 206 to the light source 18. For example, the readhead 204 comprises a light source 18, an incremental detector 22, and a reference detector 24 (comprising first 28 and second 30 detector channels offset in the measuring direction (not shown)). These readhead components are substantially the same as that described in connection with the embodiments of FIGS. 1 to 11, and operate in the same way, the only difference being that the incremental 22 and reference 24 detectors are positioned on the opposite side of the scale 206 to the light source 18. Accordingly, an interference fringe (not shown) is created and detected at the incremental detector 22 in the same manner as described in connection with FIGS. 3 and 4. Likewise, the reference position is determined in the same way, that is, by finding the reference mark zone at which a difference signal (obtained by differentially amplifying the output of the first 28 and second 30 detector channels of the reference detector 24) is contained between upper and lower thresholds. In the embodiment shown, the reference track 212 is mostly transmissive, but at a reference position comprises a feature 216 which blocks the light from reaching the reference photodetector 24. Accordingly, the reference position can be determined in much the same way as that described above in connection with FIG. 10, except that as will be understood, the signals will be inverted (i.e. the signals output from the first 28 and second 30 detector channels will dip as the readhead passes the reference position).

In the above described embodiments, a reference mark track separate to an incremental track is provided. Nevertheless, as will be understood, this need not necessarily be the case and for instance the reference position could be defined by at least one feature embedded within the incremental scale track. Furthermore, as will be understood, the invention is equally applicable to encoders in which the scale does not comprise any features defining a reference position, e.g. as illustrated by FIG. 13 which illustrates an encoder apparatus 302 comprising a readhead 304 and an incremental scale 306 comprising incremental scale features 314.

In the above described embodiments, the encoders are incremental encoders. However, as will be understood, this need not necessarily be the case. For instance, the invention is also of use with absolute encoders. As will be understood, absolute encoders comprise scales having features which uniquely identify the position along the scale. For example, the scale features could define a series of uniquely identifiable codes. A readhead could be configured to obtain a snapshot representation (e.g. an image) of the scale which is analysed to identify a position code. The presence of the structured light on the scale could interfere with the detection and analysis of the code, but the effect can be reduced if the structure of the light is misaligned with the scale's features.

Furthermore, some absolute encoders apparatus read the scale in the same or a similar manner to that as described above in connection with the illustrated embodiments of the invention. For instance, an encoder apparatus can in addition to reading a scale to find a unique position code, can also read the scale to obtain incremental information, e.g. by analysing a resultant field/interference fringe generated by the diffraction of EMR. This could be done in the same or a different readhead. Furthermore, this could be achieved by the use of single scale track (e.g. as described in WO2002/084223) or by having a dedicated incremental scale track that runs alongside any absolute scale tracks. Accordingly, as will be understood, what was described above in connection with the incremental only embodiments, equally applies to at least the incremental side of such absolute encoder apparatus.

As will be noted, in the embodiments described above, no lenses or other optical components which alter the wavefront curvature of light from the light source are provided in the readhead. However, as will be understood, this need not necessarily be the case. For instance, a lens could be used to collimate light from the light source 18. Optionally, a lens could be used for form an image of the scale. Nevertheless, as will be understood, the omission of such optical components (or the use of only very weak optical components) enables a very compact readhead to be provided. In particular, our inventors have been able to provide a readhead for use in a reflective encoder, the readhead having a total height of no more than 10 mm, and for example no more than 6.7 mm, with a total system height (top of readhead to top surface of scale) of less than 14 mm, and for example no more than 7.8 mm. Particularly, it has enabled the inventors to reduce the height between the incremental photodetector 22 and the diffraction/index grating 20 to no more than 2.3 mm.

The invention claimed is:

1. An encoder apparatus comprising a scale comprising a series of incremental or absolute features defining at least one incremental or absolute scale track and a readhead for reading the scale's features, the readhead comprising at least one light source for illuminating the scale and at least one detector, wherein the configuration of the at least one light source is such that the light source comprises at least one bond pad and/or current spreader at or near its emission surface and in its emission area, the at least one bond pad and/or current spreader imparting a structure in the light projected toward the scale, and wherein the readhead is configured such that the structure is angled so that it is substantially misaligned with respect to the incremental or absolute scale features so as to reduce measurement error in the signal output by the readhead.

2. An encoder apparatus as claimed claim 1, in which any predominant elongate components of the structure in the light projected toward the scale are angled with respect to the scale's features.

3. An encoder apparatus as claimed in claim 1, in which the configuration of the light source imparts periodicity in the structure of the light projected, in at least one direction, and in which the readhead is configured such that the direction of periodicity is angled so that it is substantially misaligned with respect to the periodicity of the scale's features.

4. An encoder apparatus as claimed in claim 1, in which the at least one light source is configured such that the intensity distribution of light projected toward the scale, as measured in the encoder apparatus' measuring dimension has a modulation depth of no more than 0.5.

5. An encoder apparatus as claimed in claim 1, in which the structure in the light comprises an array of features, and in which the readhead is configured such that the array of features are angled with respect to the scale's features.

6. An encoder apparatus as claimed in claim 1, in which the at least one light source comprises a light emitting diode (LED).

7. An encoder apparatus as claimed in claim 1, in which the detector comprises a photodetector, and in which light interacts with the scale and at least one diffraction grating within the readhead to produce a resultant field at the photodetector which changes with relative movement of the scale and readhead.

8. An encoder apparatus as claimed in claim 1, in which the readhead comprises a diffraction grating, and in which the light from the at least one light source interacts first with the scale to produce a first set of diffraction orders which then interact with the readhead's diffraction grating to produce further diffraction orders which combine to produce an interference fringe at the detector which changes with relative movement of the scale and readhead.

9. An encoder apparatus as claimed in claim 1, in which the detector comprises a photodetector array.

10. An encoder apparatus as claimed in claim 9, in which the photodetector array comprises a plurality of sensing channels extending in an array.

11. An encoder apparatus as claimed in claim 10, in which the direction of the array extends substantially parallel to the reading direction of the readhead.

12. An encoder apparatus as claimed in claim 11, in which the readhead is configured such that the structure in the light as it is projected from the light source toward the scale is angled with respect to the plurality of sensing channels.

13. An encoder apparatus as claimed in claim 10, in which the readhead is configured such that the structure in the light as it is projected from the light source toward the scale is angled with respect to the plurality of sensing channels.

14. An encoder apparatus as claimed in claim 1, in which the detector comprises a photo-sensor array which comprises two or more sets of interdigitated photo-sensitive sensors, each set detecting a different phase of an interference fringe at the detector.

15. An encoder readhead for reading a scale to determine the relative position between them, the readhead comprising:
a light source for illuminating a scale, in which the configuration of the light source is such that the light source comprises at least one bond pad and/or current spreader at or near its emission surface and in its emission area, the at least one bond pad and/or current spreader imparting a structure into the light projected by the light source; and
an array of photodetectors defining a plurality of sensing channels, in which the direction the array extends is substantially parallel to the reading direction of the readhead;
wherein the readhead is configured such that the structure in the light as it is projected from the light source toward the scale is angled with respect to the plurality of sensing channels.

* * * * *